(12) United States Patent
Yang et al.

(10) Patent No.: US 11,811,480 B2
(45) Date of Patent: Nov. 7, 2023

(54) METHOD FOR TRANSMITTING BEAM FAILURE RECOVERY REQUEST, TERMINAL DEVICE, AND NETWORK DEVICE

(71) Applicant: VIVO MOBILE COMMUNICATION CO., LTD., Guangdong (CN)

(72) Inventors: Yu Yang, Chang'an Dongguan (CN); Peng Sun, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 358 days.

(21) Appl. No.: 17/212,782

(22) Filed: Mar. 25, 2021

(65) Prior Publication Data

US 2021/0211181 A1    Jul. 8, 2021

Related U.S. Application Data

(63) Continuation of application No. PCT/CN2019/101977, filed on Aug. 22, 2019.

(30) Foreign Application Priority Data

Sep. 28, 2018   (CN) .......................... 201811142654.2

(51) Int. Cl.
    H04B 7/06      (2006.01)
    H04W 76/19    (2018.01)
    (Continued)

(52) U.S. Cl.
    CPC ........ H04B 7/0695 (2013.01); H04W 72/046 (2013.01); H04W 72/21 (2023.01);
    (Continued)

(58) Field of Classification Search
    CPC .... H04B 7/0695; H04W 76/19; H04W 76/11; H04W 72/21; H04W 72/046; H04W 74/0833; H04W 80/02
    See application file for complete search history.

(56) References Cited

U.S. PATENT DOCUMENTS

2018/0227899 A1*  8/2018  Yu .......................... H04W 74/08
2018/0279218 A1*  9/2018  Park ...................... H04W 48/20

FOREIGN PATENT DOCUMENTS

CN    107612602 A       1/2018
WO    2018/129300 A1    7/2018

OTHER PUBLICATIONS

R1-1809120 Huawei "Discussion on BFR for SCell" 3GPP WG1 #94 Gothenburg Aug. 20-24, 2018 (Year: 2018).*

(Continued)

*Primary Examiner* — Basil Ma
(74) *Attorney, Agent, or Firm* — Maschoff Brennan

(57) ABSTRACT

Embodiments of the disclosure relate to the field of communications technologies, and disclose a method for transmitting a beam failure recovery request, a terminal device, and a network device. The method includes: determining, by a terminal device, that a beam failure event has occurred in a first cell, where the first cell is served by a first network device; and transmitting a BFRQ to a second network device in a second cell, where the BFRQ is used to indicate that a beam failure event has occurred in the first cell, the second cell is served by the second network device, and the second cell is different from the first cell.

15 Claims, 4 Drawing Sheets

(51) Int. Cl.
*H04W 76/11* (2018.01)
*H04W 72/044* (2023.01)
*H04W 74/08* (2009.01)
*H04W 80/02* (2009.01)
*H04W 72/21* (2023.01)

(52) U.S. Cl.
CPC ........ *H04W 74/0833* (2013.01); *H04W 76/11* (2018.02); *H04W 76/19* (2018.02); *H04W 80/02* (2013.01)

(56) References Cited

OTHER PUBLICATIONS

JP Office action in application No. 2021-517399 dated Jun. 7, 2022.
Huawei, HiSilicon "Summary of remaining issues on beam failure recovery" R1-1800101 3GPP TSG RAN WG1 Ad doc Meeting; Jan. 22-26, 2018.
Vivo "Discussion on enhancements on multi-beam operation" R1-1812324 3GPP TSG RAN WG1 Meeting #95; Nov. 12-16, 2018.
CN Office Action in Application No. 201811142654.2 dated May 12, 2021.
"Discussion on beam recovery" 3GPP TSG-RAN WG1 Meeting #90-bis, ZTE, Sanechips, R1-1717425, Oct. 9, 2017.
"Remaining issues on beam recovery" 3GPP TSG RAN WG1 Meeting #92, NTT DOCOMO, R1-1802472, Feb. 26, 2018.
"Summary 3 on Remaining issues on Beam Failure Recovery" 3GPP TSG RAN WG1 Meeting #92bis, MediaTek Inc., R1-1805730, Apr. 16, 2018.
"Discussion on BFR for SCell" 3GPP TSG RAN WG1 Meeting #94, Huawei, HiSilicon, R1-1809120, Aug. 20, 2018.
"Non-contention based random access for beam failure recovery in CA" 3GPP TSG-RAN WG21#AH-1801, Huawei, HiSilicon, R2-1801049, Jan. 22, 2018.
Written Opinion and International Search Report in Application No. PCT/CN2019/101977 dated Nov. 19, 2019.
"Remaining issues on beam failure recovery" 3GPP TSG RAN WG1 Meeting #92b, NEC, R1-1803622, Apr. 16, 2018.
EP Search Report in Application No. 19866946.7 dated Nov. 18, 2021.
"Discussion of beam failure recovery for carrier aggregation" 3GPP TSG RAN WG1 Meeting #92, R1-1804211, Lenovo, Motorola Mobility, Apr. 16, 2018.

\* cited by examiner

METHOD FOR TRANSMITTING BEAM FAILURE RECOVERY REQUEST, TERMINAL DEVICE, AND NETWORK DEVICE

CROSS REFERENCE TO RELATED APPLICATIONS

This application is a continuation application of PCT Application No. PCT/CN2019/101977 filed on Aug. 22, 2019, which claims priority to China Patent Application No. 201811142654.2, filed with the China National Intellectual Property Administration on Sep. 28, 2018 and entitled "METHOD FOR TRANSMITTING BEAM FAILURE RECOVERY REQUEST, TERMINAL DEVICE, AND NETWORK DEVICE", the disclosures of which are incorporated herein by reference in their entireties.

TECHNICAL FIELD

Embodiments of the present disclosure relate to the field of communications technologies, and in particular, to a method for transmitting a beam failure recovery request, a terminal device, and a network device.

BACKGROUND

In a high-band communications system, because of short wavelengths of radio signals, communication is easily interrupted due to signals being blocked, moving of a terminal device (User Equipment), or other causes, and the system needs to resume communication through beam failure recovery when the communication is interrupted.

Generally, a general process of beam failure recovery is as follows: When the terminal device determines that a beam failure event has occurred and a trigger condition of a beam failure recovery request is satisfied, the terminal device may transmit a beam failure recovery request (BFRQ) to a network device on a PRACH resource associated with a determined candidate beam. After receiving the beam failure recovery request, the network device may transmit response signaling (used to instruct the terminal device to perform beam failure recovery) to the terminal device. After receiving the response instruction, the terminal device may perform beam failure recovery according to the response instruction.

The candidate beam is a beam satisfying a preset condition and determined by the terminal device by measuring a candidate beam reference signal (candidate beam RS). However, in a case in which the network device has not configured any candidate beam reference signal for a secondary cell (Scell) in which a beam failure has occurred, the terminal device cannot determine a candidate beam. Therefore, if a beam failure event occurs in the secondary cell, the terminal device cannot transmit a beam failure recovery request to the network device

SUMMARY

Embodiments of the present disclosure provide a method for transmitting a beam failure recovery request, a terminal device, and a network device.

According to a first aspect, an embodiment of the present disclosure provides a method for transmitting a beam failure recovery request, applied to a terminal device, where the method includes:

determining that a beam failure event has occurred in a first cell, where the first cell is served by a first network device; and transmitting a BFRQ to a second network device in a second cell, where the BFRQ is used to indicate that a beam failure event has occurred in the first cell, and the second cell is served by the second network device; where the second cell is different from the first cell, and both the first network device and the second network device provide services for the terminal device.

According to a second aspect, an embodiment of the present disclosure provides a method for transmitting a beam failure recovery request, applied to a second network device, where the method includes:

receiving a BFRQ from a terminal device in a second cell, where the BFRQ is used to indicate that a beam failure event has occurred in a first cell, the second cell is served by the second network device, and the first cell is served by a first network device; where the second cell is different from the first cell, and both the first network device and the second network device provide services for the terminal device.

According to a third aspect, an embodiment of the present disclosure further provides a terminal device, where the terminal device includes:

a determining module, configured to determine that a beam failure event has occurred in a first cell, where the first cell is served by a first network device; and a transmitting module, configured to transmit a BFRQ to a second network device in a second cell, where the BFRQ is used to indicate that a beam failure event has occurred in the first cell, and the second cell is served by the second network device; where the second cell is different from the first cell, and both the first network device and the second network device provide services for the terminal device.

According to a fourth aspect, an embodiment of the present disclosure provides a network device, where the network device is a second network device, and the network device includes:

a receiving module, configured to receive a BFRQ from a terminal device in a second cell, where the BFRQ is used to indicate that a beam failure event has occurred in a first cell, the second cell is served by the second network device, and the first cell is served by a first network device; where the second cell is different from the first cell, and both the first network device and the network device provide services for the terminal device.

According to a fifth aspect, an embodiment of the present disclosure provides a terminal device, including a processor, a memory, and a computer program stored in the memory and capable of running on the processor. When the computer program is executed by the processor, the steps of the method for transmitting a beam failure recovery request described in the first aspect are implemented.

According to a sixth aspect, an embodiment of the present disclosure provides a network device, where the network device is a second network device, including a processor, a memory, and a computer program stored in the memory and capable of running on the processor. When the computer program is executed by the processor, the steps of the method for transmitting a beam failure recovery request described in the second aspect are implemented.

According to a seventh aspect, an embodiment of the present disclosure provides a computer-readable storage medium. A computer program is stored in the computer-readable storage medium, and when the computer program is executed by a processor, the steps of the foregoing method for transmitting a beam failure recovery request are implemented.

DESCRIPTION OF EMBODIMENTS

Figure 1:
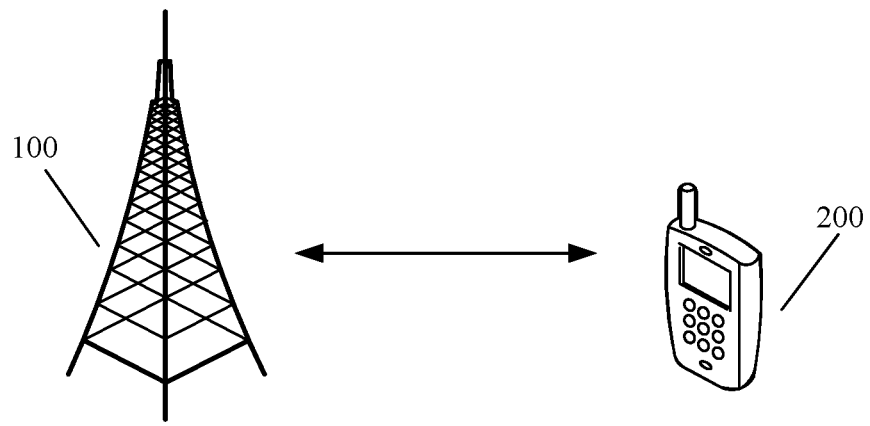
FIG. 1 is a schematic structural diagram of a communications system according to an embodiment of the present disclosure.

The following clearly describes the technical solutions in the embodiments of the present disclosure with reference to the accompanying drawings in the embodiments of the present disclosure. Apparently, the described embodiments are some but not all of the embodiments of this application. All other embodiments obtained by a person of ordinary skill in the art based on the embodiments of this application without creative efforts shall fall within the protection scope of this application.

In the embodiments of the present disclosure, the terms "an example" or "for example" are used to represent an example, an illustration, or a description. Any embodiment or design solution described as "an example" or "for example" in the embodiments of the present disclosure should not be construed as preferred or advantageous over other embodiments or design solutions. To be precise, the terms, such as "an example" or "for example", are intended to present a related concept in a specific manner.

In the description of the embodiments of the present disclosure, unless otherwise specified, "plurality" means at least two, for example, a plurality of processing units mean two or more processing units, and a plurality of components mean two or more components.

In a high-band communications system, when communication interruption occurs, communication resumption takes a long time in a conventional radio link reestablishment manner. Therefore, a beam failure recovery mechanism is introduced to the related art. The beam failure recovery mechanism usually includes four contents: beam failure detection, candidate beam identification (New candidate beam identification), transmitting a beam failure recovery request (BFRQ), and receiving a response for the beam failure recovery request.

Beam failure detection: A terminal device performs measurement on a beam failure detection reference signal (BFD RS) at a physical layer, and determines, based on a measurement result, whether a beam failure event has occurred. A determining criterion is: if it is detected that metrics (hypothetical physical downlink control channel block error rate (hypothetical PDCCH BLER)) of all serving beams satisfy a preset condition (exceeding a preset threshold), one beam failure instance (BFI) is determined, and the physical layer of the terminal device reports an indication to a higher layer (MAC layer) of the terminal device. The reporting procedure is periodical, and a BFI reporting period is a shortest period of the BFD RS, with a lower bound being 2 ms. On the contrary, if the physical layer of the terminal device determines that no beam failure instance has occurred, no indication is transmitted to the higher layer. The higher layer of the terminal device uses a counter and a timer to count BFIs reported by the physical layer, restarts the timer each time a BFI is received, and restarts the counter when the timer expires. When the counter reaches a maximum count configured by a network, the terminal device determines that a beam failure event has occurred. In the related art, the counter and timer at the MAC layer of the terminal device are configured for each active bandwidth part (active BWP), and start and maintenance of the counter and timer on each BWP are independent, that is, the counter and timer of each BWP work independently, including start, reset, counting, timing, and the like.

Candidate beam identification: The network device configures a candidate beam reference signal (candidate beam RS) for the terminal, and the physical layer of the terminal device measures the candidate beam reference signal to find a new candidate beam. This step is not necessarily performed after occurrence of a beam failure event, and may alternatively be performed before occurrence of a beam failure event, that is, may be performed at any time. When receiving a request, an indication, or a notification from the higher layer (MAC layer) of the terminal device, the physical layer of the terminal device reports, to the higher layer of the terminal device, a measurement result that meets a preset condition (a measurement layer 1-reference signal received power (L1-RSRP) of the candidate beam RS exceeds a preset threshold), where content of the report is {beam RS index, L1-RSRP}, and the higher layer of the terminal device selects a candidate beam based on the report of the physical layer.

Beam failure recovery request: The higher layer (MAC layer) of the terminal device determines a physical random access channel (PRACH) resource based on the selected candidate beam. If the terminal device finds the candidate beam and a contention-free PRACH resource associated with the candidate beam is configured for the candidate beam, a beam failure recovery request is transmitted to a base station by using the contention-free PRACH resource. Otherwise, the terminal device may use a contention-based PRACH resource. Only the contention-based PRACH resource can be used when a beam failure recovery timer expires. A total quantity of times using the two types of PRACH resources (the contention-free PRACH resource and the contention-based PRACH resource) cannot exceed a preset value. The contention-free PRACH resource herein and other PRACH resources (such as a PRACH resource used for initial access) may be FDMed or CDMed. In addition, in a legacy scheme, transmitting a BFRQ through a physical uplink control channel (PUCCH) is also supported.

The terminal device monitors a response for the beam failure recovery request from the base station: After receiving the BFRQ, the base station transmits a response in a dedicated PDCCH of a configured control resource set-beam failure recovery (CORESET-BFR), where the response carries a cell radio network temporary identifier (C-RNTI) or may include an indication of switching over to a new candidate beam or restarting beam search, or other indications. The CORESET-BFR is spatially quasi-co-located (QCL) with a downlink (DL) reference signal (RS) of the candidate beam found by the terminal device. If beam failure recovery is unsuccessful, that the physical layer of the terminal device transmits an indication to the higher layer of the terminal device for the higher layer to determine a subsequent radio link failure procedure.

However, in a case in which the terminal device cannot transmit a BFRQ in a secondary cell in which a beam failure event has occurred (including, but not limited to, that the network device has not configured any candidate beam reference signal for the secondary cell or has not configured, for the secondary cell, any uplink channel resource for transmitting a BFRQ), the terminal device cannot implement transmission of the beam failure recovery request according to the beam failure recovery mechanism described above.

Therefore, the embodiments of the present disclosure provide a method for transmitting a beam failure recovery request. The terminal device may determine occurrence of a beam failure event in a first cell and transmit a BFRQ to a second network device in a second cell, so as to notify a network device (which may be the first network device, the second network device, or another network device) processing the beam failure event of the first cell to trigger a beam failure recovery procedure of the first cell based on the BFRQ. With this scheme, in the case in which a beam failure event has occurred in the first cell, the BFRQ can be transmitted to the network device in the second cell that is different from the first cell, thereby resolving the prior-art problem that a terminal device cannot transmit a beam failure recovery request to a network device when a beam failure event occurs in a secondary cell.

It should be noted that the method for transmitting a beam failure recovery request provided in the embodiments of the present disclosure may not only be used in the beam failure recovery mechanism, but also be used in other scenarios in which information is transmitted on a resource of another cell (a primary cell or a secondary cell) when the information is not convenient or cannot be transmitted in a local cell. A specific application scenario is not limited in this application.

The technical solution provided in this application can be applied to various communications systems, such as a 5G communications system, a future evolved system, or a plurality of communication fusion systems. Examples of various application scenarios may include scenarios such as machine-to-machine (M2M), D2M, macro-micro communication, enhanced mobile Internet (enhanced Mobile Broadband, eMBB), ultra-reliable low-latency communications (uRLLC), and mass machine type communication (mMTC). These scenarios include, but are not limited to, scenarios such as communication between terminal devices, communication between network devices, or communication between a network device and a terminal device. The embodiments of the present disclosure can be applied to communication between a network device and a terminal device, or communication between terminal devices, or communication between network devices in a 5G communications system.

FIG. 1 is a possible schematic structural diagram of a communications system included in the embodiments of the present disclosure. As shown in FIG. 1, the communications system includes at least one network device 100 (only one is shown in FIG. 1 as an example) and one or more terminal devices 200 (only one is shown in FIG. 1 as an example) to which each network device 100 is connected.

The at least one network device 100 may serve a cell group (for example, a master cell group (MCG) or a secondary cell group (SCG)). One cell group includes at least one primary cell (for example, a primary cell (PCell) in the master cell group or a primary secondary cell (PSCell) in the secondary cell group), and may further include at least one secondary cell (for example, a secondary cell (SCell) in the master cell group or a secondary cell (SCell) in the secondary cell group).

For example, the communications system shown in FIG. 1 may be a multi-carrier communications system, such as a carrier aggregation scenario or a dual-connectivity scenario, which is not limited in this embodiment of the present disclosure.

The network device 100 may be a base station, a core network device, a transmission and reception point (TRP), a relay station, an access point, or the like. The network device 100 may be a base transceiver station (BTS) in a Global System for Mobile Communications (GSM) or Code Division Multiple Access (CDMA) network, may be an NB (NodeB) in Wideband Code Division Multiple Access (WCDMA), or may be an eNB or eNodeB (evolutional NodeB) in LTE. The network device 100 may alternatively be a radio controller in a cloud radio access network (CRAN) scenario. The network device 100 may alternatively be a network device in a 5G communications system or a network device in a future evolved network. However, the use of words does not constitute any limitation on this application.

The terminal device 200 may be a wireless terminal device or may be a wired terminal device. The wireless terminal device may be a device that provides voice and/or other service data connectivity to a user, a handheld device having a wireless communication function, a computing device or other processing devices connected to a wireless modem, an in-vehicle device, a wearable device, a terminal device in a future 5G network, or a terminal device in a future evolved PLMN network, or the like. The wireless terminal device may communicate with one or more core networks via a radio access network (RAN). The wireless terminal device may be a mobile terminal device such as a mobile phone (or referred to as "cellular" phone) and a computer having a mobile terminal device, such as a portable, pocket-sized, handheld, computer built-in, or in-vehicle mobile apparatus, which exchanges voice and/or data with the radio access network; or may be a device such as a personal communication service (PCS) phone, a cordless phone, a session initiation protocol (SIP) phone, a wireless local loop (WLL) station, or a personal digital assistant (PDA). The wireless terminal device may also be a mobile device, user equipment (UE), a UE terminal device, an access terminal device, a wireless communication device, a terminal device unit, a terminal device station, a mobile station, a mobile, a remote station, a remote site, a remote terminal device (Remote Terminal), a subscriber unit, a subscriber station, a user agent, a terminal device apparatus, or the like. As an example, in this embodiment of the present disclosure, FIG. 1 uses an example that the terminal device is a mobile phone.

With reference to FIG. 1, it is assumed that a network device 100 serves one cell group, and the cell group includes one primary cell and a plurality of secondary cells. When the terminal device 200 determines that a beam failure event has occurred in a first cell of the plurality of secondary cells, the terminal device 200 may transmit, to the network device 100 in a second cell of the cell group, a BFRQ indicating that a beam failure event has occurred in the first cell. The network device 100 receives the BFRQ and performs beam failure recovery processing on the first cell. The second cell may be a primary cell, or may be another secondary cell different from the first cell in the plurality of secondary cells. It should be noted that, in a specific implementation process, one cell group may be served by at least one network device, the first cell and the second cell may be cells served by different network devices in the same cell group, or the first cell and the second cell may belong to different cell groups. Specifically, when there is one cell group, the cell group includes at least one primary cell and one secondary cell. In this case, the first cell in which the beam failure event has occurred may be a secondary cell in the cell group, and the second cell may be a primary cell in the cell group or another secondary cell different from the first cell. When there are at least two cell groups, one cell group includes at least one primary cell and one secondary cell (which may be the first cell in which the beam failure event occurs), and each of the other cell groups includes at least one primary cell.

A method for transmitting a beam failure recovery request provided in the embodiments of the present disclosure may be applied to a scenario in which the terminal device cannot transmit the BFRQ in the secondary cell in which a beam failure event has occurred (including, but not limited to, that the network device has not configured any candidate beam reference signal for the secondary cell or has not configured, for the secondary cell, any uplink channel resource for transmitting a BFRQ). In other words, in the method for transmitting a beam failure recovery request provided in the embodiments of the present disclosure, even if the terminal device cannot transmit the BFRQ in the secondary cell in which the beam failure event has occurred, the terminal device can still transmit the BFRQ in another cell (for example, a primary cell or another secondary cell), thereby implementing transmission of the beam failure recovery request.

Figure 2:
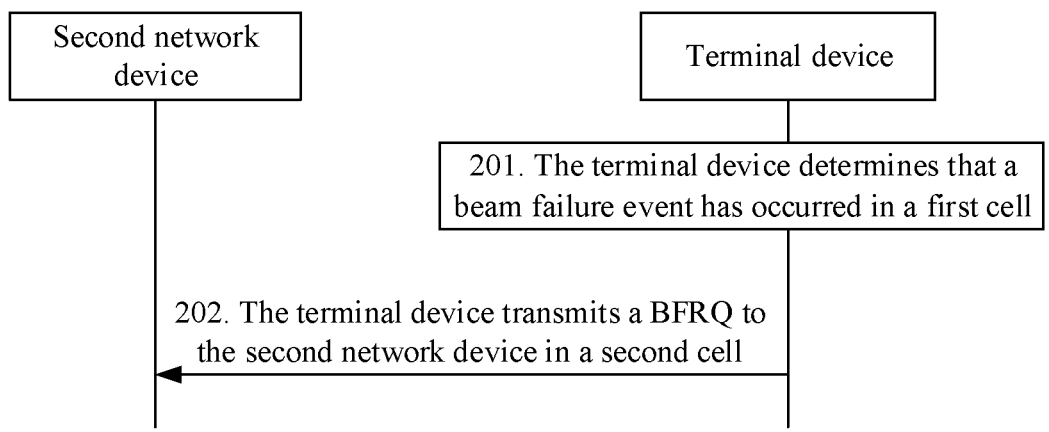
FIG. 2 is a flowchart 1 of a method for transmitting a beam failure recovery request according to an embodiment of the present disclosure.

FIG. 2 is a schematic flowchart of a method for transmitting a beam failure recovery request according to an embodiment of the present disclosure. As shown in FIG. 2, the method may be applied to a terminal device, and the method for transmitting a beam failure recovery request may include the following steps.

Step 201: The terminal device determines that a beam failure event has occurred in a first cell.

The first cell is served by a first network device.

A network device may configure, by using radio resource control (RRC) signaling, a BFD RS resource for each cell of a cell group in which the terminal device is located. The RRC signaling may further include an identifier (for example, a cell index) of a cell in which the BFD RS resource is located.

The network device that configures the BFD RS resource for the terminal device by using the RRC signaling may be the first network device, or may be any other network devices that provide a service for the terminal device, which is not limited in this embodiment of the present disclosure.

The terminal device measures the BFD RS and determines, based on a measurement result, in which cell the beam failure event has occurred. For a specific procedure of BFD RS detection, reference may be made to the exiting related art, and details are not described herein.

For example, the terminal device measures the BFD RS and determines, based on a result, that the beam failure event occurs in the first cell.

Step 202: The terminal device transmits a BFRQ to a second network device in a second cell.

The BFRQ is used to indicate that a beam failure event has occurred in the first cell, and the second cell is served by the second network device.

The second cell is different from the first cell, and both the first network device and the second network device provide services for the terminal device.

The second network device may be the same as or different from the first network device, which is not limited in this embodiment of the present disclosure.

Optionally, the BFRQ includes an identifier of the first cell. Optionally, the BFRQ may also include other information used for indicating that a beam failure event has occurred in the first cell. Optionally, the BFRQ may be further used to indicate information other than occurrence of a beam failure event in the first cell, which is specifically set according to actual requirements. This is not limited in this embodiment of the present disclosure.

In this way, after receiving the BFRQ, a network device processing the BFRQ may determine, based on the identifier of the first cell, that a cell in which the beam failure event has occurred is the first cell.

The first cell is usually a secondary cell in a cell group. The first cell and the second cell may be cells in the same cell group or cells in different cell groups.

Optionally, the second cell is a primary cell served by the second network device or a secondary cell served by the second network device.

Specifically, the second cell and the first cell are cells in the same cell group, the first cell is a secondary cell in the cell group, and the second cell is a primary cell in the cell group or a secondary cell different from the first cell; or the second cell and the first cell are cells in different cell groups, the first cell is a secondary cell in a first cell group, the second cell is a primary cell or a secondary cell in a second cell group, and the first cell group is different from the second cell group (for example, in a dual-connectivity scenario, the first cell group is a master cell group, the first cell is a secondary cell in the master cell group, the second cell group is a primary secondary cell group, and the second cell is a primary secondary cell or a secondary cell in the primary secondary cell group; or the first cell group is a primary secondary cell group, the first cell is a secondary cell in the primary secondary cell group, the second cell group is a master cell group, and the second cell is a primary cell or a secondary cell in the master cell group).

In this case, when the beam failure event occurs in the first cell, a plurality of cells may have a capability of transmitting the BFRQ, thereby increasing selection for the terminal device to improve flexibility, and transmitting the BFRQ quickly to further improve the communication efficiency and performance.

Optionally, the second cell is determined in at least one of the following manners: a type of the second cell is specified by a communication protocol, the second cell is configured for the terminal device by a fourth network device, and the second cell is determined by the terminal device. Specifically, at least the following cases are included:

1. The communication protocol specifies that the type of the second cell is a primary cell.
2. The communication protocol specifies that the type of the second cell is a secondary cell, and the fourth network device configures, for the terminal device, the second cell to be which secondary cell in which cell group.
3. The communication protocol specifies that the type of the second cell is a secondary cell, and the terminal device determines the second cell to be which secondary cell in which cell group.
4. The fourth network device configures, for the terminal device, the second cell to be a primary cell or which secondary cell in which cell group.
5. The terminal device determines the second cell to be a primary cell or which secondary cell in which cell group.

For example, that the communication protocol specifies the type of the second cell being a primary cell may be that the communication protocol prescribes that "the type of the second cell used for transmitting the BFRQ is a primary cell".

The fourth network device may be the same as the first network device or the second network device, or may be different from both the first network device and the second network device, which is specifically set according to an actual situation. This is not limited in this embodiment of the present disclosure.

Optionally, the fourth network device may configure the second cell for the terminal device by using RRC signaling, where the RRC signaling may be RRC initial configuration signaling or RRC reconfiguration signaling, and a transmission time, a transmission form, and the like of the RRC signaling are not limited in this embodiment of the present disclosure.

The second cell may be determined in at least one of the foregoing plurality of manners, which is relatively flexible. Further, after the second cell is determined, a rate at which the terminal device transmits the BFRQ can be accelerated, thereby improving the communication efficiency and performance.

Optionally, in a case in which the second cell is configured for the terminal device by the fourth network device, the second cell is a cell configured for the terminal device by the fourth network device and having a preset association with the first cell, or the second cell is a cell configured for the terminal device by the fourth network device, or the second cell is a cell that is indicated by the fourth network device for the terminal device in a plurality of cells configured for the terminal device by the fourth network device, or the second cell is a cell that is determined by the terminal device in a plurality of cells configured for the terminal device by the fourth network device.

1. The cell having the preset association means a plurality of cells that can transmit a beam failure recovery request to each other. For example, in a plurality of cells having an association relationship, if the terminal device determines that a beam failure event has occurred in one cell (a cell A is used as an example for description below), a BFRQ may be transmitted in any cell (a cell B is used as an example for description below) other than the cell A to a network device corresponding to the cell B, and the BFRQ is used to indicate that a beam failure event has occurred in the cell A.

For example, in this embodiment of the present disclosure, the first cell and the second cell are cells having an association relationship. When a beam failure event occurs in the first cell, the terminal device may transmit a BFRQ in the second cell to the second network device, and the BFRQ is used to indicate that a beam failure event has occurred in the first cell. When a beam failure event occurs in the second cell, the terminal device may transmit a BFRQ in the first cell to the second network device, and the BFRQ is used to indicate that a beam failure event has occurred in the second cell.

2. That the second cell is a cell configured for the terminal device by the fourth network device is specifically: The second cell is a cell configured for the terminal device by the fourth network device and serving as a fixed cell for transmitting a BFRQ. For example, in at least one cell group, a cell A in the at least one cell group is specified as the fixed cell for transmitting the BFRQ. When the terminal device determines that a beam failure event has occurred in any one cell (a cell B is used as an example for description below) of the at least one cell group, a BFRQ is transmitted in the cell A, and the BFRQ is used to indicate that a beam failure event has occurred in the cell B.

3. That the second cell is a cell that is indicated by the fourth network device for the terminal device in a plurality of cells configured for the terminal device by the fourth network device is specifically: The fourth network device configures the plurality of cells for the terminal device (for example, RRC signaling may be used for configuration) to serve as cells for transmitting a BFRQ, and the fourth network device indicates (for example, a media access control-control element MAC-CE command or downlink control information DCI may be used for indication) that the second cell is a cell for prioritizing transmission of a BFRQ.

4. That the second cell is a cell that is determined by the terminal device in a plurality of cells configured for the terminal device by the fourth network device is specifically: The fourth network device configures the plurality of cells for the terminal device to serve as cells for transmitting a BFRQ, and the terminal device determines, from the plurality of cells according to a third preset rule, which cell to be used, where the third preset rule may be randomly selecting one cell or may be another rule, which is not limited in this embodiment of the present disclosure.

Regardless of which one of the foregoing manners 1 to 4 used for configuring, by the fourth network device, the cell (including the second cell) for transmitting the BFRQ, when a total quantity of times of transmitting the BFRQ in the second cell exceeds a preset quantity of times and it is determined that beam failure recovery has not succeed, the terminal device can always determine that beam failure recovery this time is unsuccessful, and a physical layer of the terminal device transmits one piece of indication information to a higher layer of the terminal device for the higher layer to perform a subsequent radio link failure and reestablishment procedure. However, if the fourth network device configures a plurality of cells for transmitting a BFRQ for the terminal device based on a configuration scheme corresponding to the manner 3 or manner 4 described above, the terminal device may re-determine one cell (a cell other than the second cell) from the plurality of cells for transmitting the BFRQ as a cell for transmitting the BFRQ and retransmit the BFRQ; or the fourth network device may re-indicate, for the terminal device, one cell (a cell other than the second cell) in the plurality of cells for transmitting the BFRQ as a cell for transmitting the BFRQ, and the terminal device re-transmits the BFRQ on the re-indicated cell.

The second cell may be determined in at least one of the foregoing plurality of manners, which is relatively flexible.

Further, after the second cell is determined, a rate at which the terminal device transmits the BFRQ can be accelerated, thereby improving the communication efficiency and performance.

Correspondingly, the second network device receives the BFRQ from the terminal device in the second cell.

This embodiment of the present disclosure provides a method for transmitting a beam failure recovery request. The terminal device can determine occurrence of a beam failure event in the first cell and transmit the BFRQ to the second network device in the second cell, so as to notify a network device (which may be the first network device, the second network device, or another network device) processing the beam failure event of the first cell to trigger a beam failure recovery procedure of the first cell based on the BFRQ. With this scheme, in the case in which a beam failure event has occurred in the first cell, the BFRQ can be transmitted to the network device in the second cell that is different from the first cell, thereby resolving the prior-art problem that a terminal device cannot transmit a beam failure recovery request to a network device when a beam failure event occurs in a secondary cell.

Optionally, step 202 may specifically include the following step 202a.

Step 202a: In a case in which a third network device has not configured any candidate beam reference signal for the terminal device in the first cell, or the third network device has not configured, for the terminal device in the first cell, any uplink channel resource for transmitting the BFRQ, the terminal device transmits the BFRQ to the second network device in the second cell.

The third network device provides a service for the terminal device. The third network device may be the same as the first network device, the second network device, or the fourth network device, or may be different from the first network device, the second network device, and the fourth network device, which is specifically set according to an actual situation. This is not limited in this embodiment of the present disclosure.

Step 202a may include, but is not limited to, at least three cases below:

Case 1: In a case in which the third network device has not configured any candidate beam reference signal for the terminal device in the first cell, the terminal device transmits the BFRQ to the second network device in the second cell.

If the third network device has not configured any candidate beam reference signal for the terminal device in the first cell, resource overheads for the candidate beam reference signal can be reduced.

Case 2: In a case in which the third network device has configured a candidate beam reference signal for the terminal device in the first cell, but has not configured any uplink channel resource for transmitting the BFRQ for the terminal device in the first cell, the terminal device transmits the BFRQ to the second network device in the second cell, thereby reducing uplink channel resource overheads. Specifically, the terminal device is able to determine a candidate beam by measuring the candidate beam reference signal, but cannot find an uplink channel resource associated with the candidate beam and used for transmitting the BFRQ. Therefore, the terminal device does not need to measure the candidate beam reference signal in this case. For a method for determining the candidate beam by measuring the candidate beam reference signal, reference may be made to the exiting related art, and details are not described herein.

Case 3: In a case in which the third network device has not configured any uplink channel resource for transmitting the BFRQ for the terminal device in the first cell, the terminal device transmits the BFRQ to the second network device in the second cell, thereby reducing uplink channel resource overheads.

Correspondingly, in a case in which the third network device has not configured any candidate beam reference signal for the terminal device in the first cell, or the third network device has not configured any uplink channel resource for transmitting the BFRQ for the terminal device in the first cell, the second network device receives the BFRQ from the terminal device in the second cell.

Further optionally, step 202 or step 202a may specifically include the following step 202b.

Step 202b: The terminal device transmits the BFRQ to the second network device in the second cell through a first bearer.

The first bearer includes at least one of a physical random access channel (PRACH), a physical uplink control channel (PUCCH), a semi-persistent-physical uplink shared channel (SP-PUSCH), and a media access control-control element (MAC-CE) command. The first bearer may further include other feasible bearers, which is not limited in this embodiment of the present disclosure.

For example, if the first bearer is one of the PRACH, the PUCCH, the SP-PUSCH, and the MAC-CE command, the terminal device transmits the BFRQ in the second cell to the second network device through the PRACH, the PUCCH, the SP-PUSCH, and the MAC-CE command.

For example, if the first bearer is at least two of the PRACH, the PUCCH, the SP-PUSCH, and the MAC-CE command, the terminal device transmits the BFRQ in the second cell to the second network device through the at least two of the PRACH, the PUCCH, the SP-PUSCH, and the MAC-CE command. For example, if the first bearer is the PRACH and the MAC-CE command, the terminal device transmits the BFRQ to the second network device in the second cell through the PRACH, and the terminal device transmits the BFRQ to the second network device in the second cell through the MAC-CE command; and so on.

The BFRQ is transmitted to the second network device in the second cell through the first bearer, thereby further quickly implementing transmission of the BFRQ to the network device and improving the communication efficiency and performance.

Optionally, the first bearer is specified by a communication protocol, or the first bearer is configured or scheduled for the terminal device by a fifth network device. The fifth network device provides a service for the terminal device.

The fifth network device may be the same as the first network device, the second network device, the third network device, or the fourth network device, or may be different from the first network device, the second network device, the third network device, and the fourth network device, which is specifically set according to an actual situation. This is not limited in this embodiment of the present disclosure.

For specific description, reference may be made to the foregoing related description, and details are not described herein again.

For example, the PRACH and the PUCCH may be configured for the terminal device by the fifth network device, the SP-PUSCH may be scheduled for the terminal device by the fifth network device, and the MAC-CE command may be specified by the communication protocol.

When the first bearer includes the MAC-CE command, several bytes may be added to the MAC-CE command and are used to store the BFRQ.

The first bearer may be determined in at least one of the foregoing plurality of manners, which is relatively flexible. Further, after the first bearer is determined, a rate at which the terminal device transmits the BFRQ can be accelerated, thereby improving the communication efficiency and performance.

Correspondingly, the second network device receives the BFRQ from the terminal device in the second cell through the first bearer.

If only one type of bearer for transmitting the BFRQ is configured or scheduled by the fifth network device or specified by the communication protocol, the terminal device transmits the BFRQ through the one type of bearer. If a plurality of bearers for transmitting the BFRQ is configured or scheduled by the fifth network device or specified by the communication protocol, the terminal device may determine, according to a specific rule, at least one of the plurality of bearers for transmitting the BFRQ.

Figure 3:
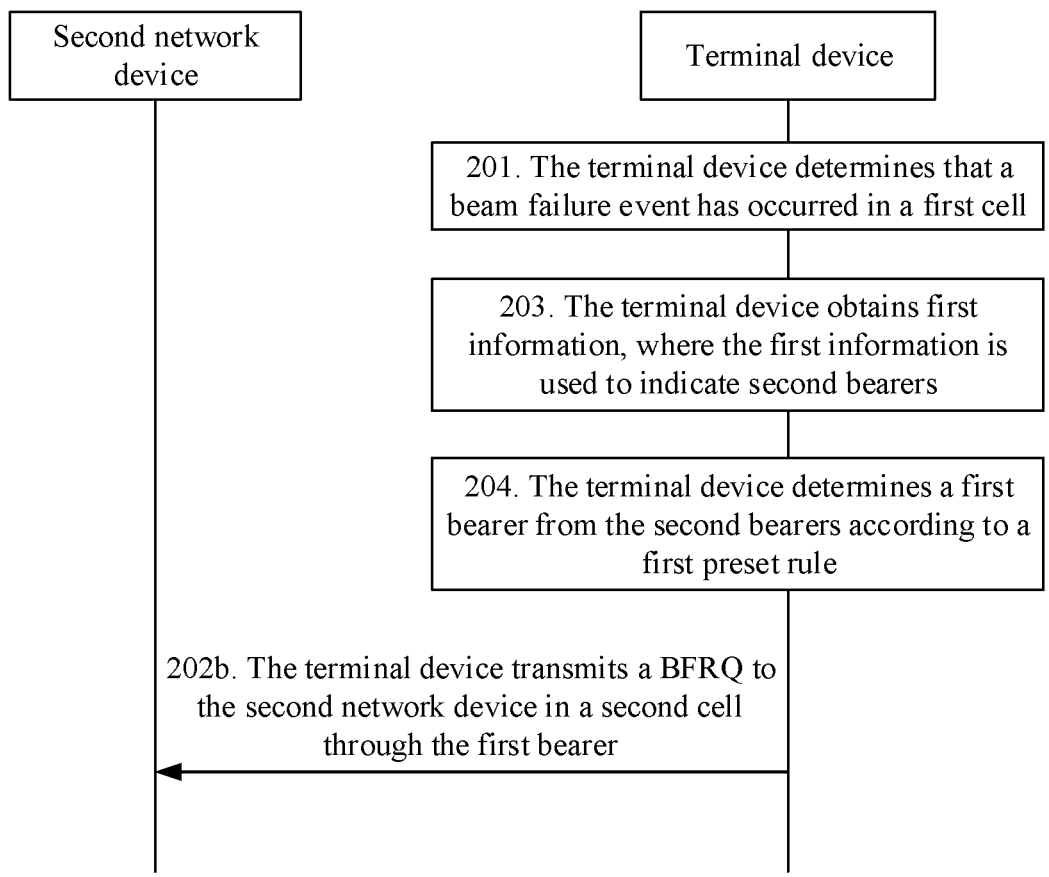
FIG. 3 is a flowchart 2 of a method for transmitting a beam failure recovery request according to an embodiment of the present disclosure.

Optionally, as shown in FIG. 3, before step 202b, the following steps 203 and 204 may be further included.

203. The terminal device obtains first information, where the first information is used to indicate second bearers.

The second bearers are used by the terminal device to transmit the BFRQ, and the second bearers include at least two of the PRACH, the PUCCH, the SP-PUSCH, and the MAC-CE command.

The terminal device may obtain the first information from configuration or indication information of the network device, may obtain the first information from a storage unit of the terminal device, or may obtain the first information from another device, which is not limited in this embodiment of the present disclosure.

204. The terminal device determines the first bearer from the second bearers according to a first preset rule.

Optionally, the first preset rule is any one of the following: any one bearer in the second bearers, a bearer with a highest priority in the second bearers, a next available bearer in the second bearers, and all bearers in the second bearers.

In a case in which the second bearers include N of the PRACH, the PUCCH, the SP-PUSCH, and the MAC-CE command, the first preset rule may alternatively be any one of the following: M bearers in the second bearers, M bearers with the highest priority in the second bearers, and M next available bearers in the second bearers, where N is greater than or equal to 2 and less than or equal to 4, and M is greater than or equal to 2 and less than or equal to (N−1).

In this way, when a quantity of the second bearers is greater than or equal to 2, the terminal device can quickly determine, according to the first preset rule, the first bearer for transmitting the BFRQ, thereby improving the communication efficiency and performance.

Optionally, the first preset rule is specified by the communication protocol, or the first preset rule is configured for the terminal device by a sixth network device, or the first preset rule is determined by the terminal device. The sixth network device provides a service for the terminal device.

The sixth network device may be the same as the first network device, the second network device, the third network device, the fourth network device, or the fifth network device, or may be different from the first network device, the second network device, the third network device, the fourth network device, and the fifth network device, which is specifically set according to an actual situation. This is not limited in this embodiment of the present disclosure.

For specific description, reference may be made to the foregoing related description, and details are not described herein again.

The first preset rule may be determined in at least one of the foregoing plurality of manners, which is relatively flexible. Further, after the first preset rule is determined, a rate at which the terminal device transmits the BFRQ can be accelerated, thereby improving the communication efficiency and performance.

Optionally, in the case in which the first bearer includes at least one of the PUCCH or the SP-PUSCH, step 202b may specifically include the following step 202b1:

202b1: The terminal device transmits the BFRQ to the second network device in the second cell through a target channel according to a second preset rule if the target channel includes second information, where the target channel is the PUCCH or the SP-PUSCH.

Optionally, the second preset rule is: transmitting the BFRQ based on priorities of the second information and the BFRQ, or multiplexing the second information and the BFRQ for transmission, or prioritizing transmission of the BFRQ.

If the second preset rule is transmitting the BFRQ based on the priorities of the second information and the BFRQ, one with a higher priority is transmitted before transmission of the other with a lower priority based on the priorities of the second information and the BFRQ. For example, if the second information has a higher priority in the second information and the BFRQ, the second information is transmitted first, and then the BFRQ is transmitted. If the BFRQ has a higher priority in the second information and the BFRQ, the BFRQ is transmitted first, and then the second information is transmitted.

If the second preset rule is multiplexing the second information and the BFRQ for transmission, the second information and the BFRQ are multiplexed on an uplink channel resource for transmission together.

If the second preset rule is prioritizing transmission of the BFRQ, the BFRQ is preferentially transmitted when a transmission occasion of the target channel is reached.

In this way, when the target channel includes the second information, the terminal device can quickly determine, according to the second preset rule, how to transmit the BFRQ, thereby improving the communication efficiency and performance.

Optionally, the second preset rule is specified by the communication protocol, or the second preset rule is configured for the terminal device by a seventh network device, or the second preset rule is determined by the terminal device. The seventh network device provides a service for the terminal device.

The seventh network device may be the same as the first network device, the second network device, the third network device, the fourth network device, the fifth network device, or the sixth network device, or may be different from the first network device, the second network device, the third network device, the fourth network device, the fifth network device, and the sixth network device, which is specifically set according to an actual situation. This is not limited in this embodiment of the present disclosure.

For specific description, reference may be made to the foregoing related description, and details are not described herein again.

The second preset rule may be determined in at least one of the foregoing plurality of manners, which is relatively flexible. Further, after the second preset rule is determined, a rate at which the terminal device transmits the BFRQ can be accelerated, thereby improving the communication efficiency and performance.

It should be noted that when configuration information is transmitted by using RRC signaling, the third network device, the fourth network device, the fifth network device, and the sixth network device are generally network devices serving a primary cell in a cell group, and the network device transmits the RRC signaling in the primary cell. In this embodiment of the present disclosure, the third network device, the fourth network device, the fifth network device, and the sixth network device may alternatively be network devices serving any one cell in a cell group, and the network device transmits the RRC signaling in the any one cell.

It should be noted that after the second network device receives the BFRQ from the terminal device, if the second network device is a network device processing the BFRQ, the second network device processes the BFRQ. If the second network device is not the network device processing the BFRQ, the second network device forwards the BFRQ to the network device processing the BFRQ, and the network device processing the BFRQ processes the BFRQ. For a specific forwarding procedure, reference may be made to the exiting related art, and details are not described herein.

An eighth network device (which may be the second network device, the first network device, or another network device, not being listed herein one by one) being the network device processing the BFRQ is used as example for description below.

After receiving the BFRQ, the eighth network device triggers the terminal device to perform aperiodic beam measurement and reporting.

The eighth network device transmits the trigger signaling in a third cell, and the third cell may be the second cell or a cell other than the second cell and the first cell, which is not limited in this embodiment of the present disclosure.

For the description of the third cell, reference may be made to the foregoing related description of the second cell, and details are not described herein again.

For details about how to transmit the trigger signaling in the third cell, reference may be made to the exiting related art, and details are not described herein.

For example, the trigger signaling may be carried in downlink control information (DCI), and the trigger signaling may include an identifier of the first cell, so that the terminal device determines that a cell for triggering aperiodic beam measurement and reporting is the first cell in which a beam failure has occurred.

Based on the trigger signaling of the eighth network device, the terminal device measures a reference signal (RS) resource configured by the eighth network device to implement beam measurement and perform reporting based on a measurement result.

The terminal device preferentially selects the first cell to report the beam measurement result to the eighth network device. For a specific reporting procedure, refer to the exiting related art. Alternatively, the terminal device reports the beam measurement result in a cell other than the first cell. For a specific reporting procedure, refer to the procedure of transmitting the BFRQ. Details are not described herein again.

The eighth network device performs beam failure recovery processing on the first cell based on the beam measurement result reported by the terminal device. A specific processing manner may include any one of the following manners 1 and 2:

1. deactivating (namely, releasing) the first cell, where the deactivating the first cell may be construed as deactivating a carrier corresponding to the first cell; and 2. reconfiguring the first cell, for example, reconfiguring QCL information of a CORESET (namely, reconfiguring beam information of a control channel).

For a process of performing beam failure recovery processing on the first cell by the eighth network device, refer to the exiting related art. Details are not described herein.

Optionally, for a PUSCH scheduled by using a DCI format 0_0 in a cell, a spatial relation of the PUSCH is: using a spatial relation of a specific PUCCH in an active uplink BWP in the cell. The specific PUCCH is a PUCCH with a specific ID in a dedicated PUCCH resource, such as a PUCCH with a minimum ID.

Optionally, after initial access, that is, in an RRC connected mode, the UE does not expect the network to schedule the PUSCH by using the DCI format 0_0 in a BWP that is in a frequency range 2 (Frequency range2, namely, a millimeter band) and that has no PUCCH resource configured with PUCCH_SpatialRelationInfo. That is, when the network schedules the PUSCH by using the DCI format 0_0 in the BWP, if the BWP is a BWP in the frequency range 2 (Frequency range2, namely, a millimeter band), the BWP needs to have a PUCCH resource for which PUCCH_SpatialRelationInfo is configured by the network.

Optionally, when a plurality of search spaces (SS) that the terminal monitors are associated with a plurality of CORESETs, if monitoring occasions of the SSs overlap or partially overlap in the time domain or an interval is less than a specific time (that is, a time interval is less than a beam switching time between different CORESETs), and there is a CORESET for which a TCI state is configured and activated and a CORESET for which a TCI state is not configured (the CORESET herein may alternatively not include a CORESET-BFR in the beam failure recovery procedure), in the overlapping time (on overlapping OFDM symbols), the terminal uses the TCI state of the CORESET for which the TCI state is configured and activated to monitor the SSs of all the CORESETs in the overlapping time.

(1) Further, for the used TCI state of the CORESET for which the TCI state is configured and activated, when there are a plurality of such CORESETs, a TCI state of a CORESET with a specific CORESET ID in the CORESETs for which the TCI states are configured and activated is used, so as to ensure that the CORESETs in the overlapping time have the same spatial QCL information.

Example 1: The specific CORESET ID is a lowest CORESET ID in the cell.

Example 2: In a CA scenario, when CORESETs in different cells overlap or partially overlap in the time domain or an interval is less than a specific time, a TCI state of a CORESET with a specific CORESET ID in a specific cell (for example, with a minimum cell index) is used to monitor CORESETs of other cells.

Further, the cell index and those of other cells indicate a same band.

(2) Further, when the foregoing time-domain overlapping occurs between CORESETs of cells with different subcarrier spacings, the method in the foregoing CA scenario is used.

(3) Further, in the cells with different subcarrier spacings, when the foregoing time-domain overlapping occurs between a specific CORESET in which a PDSCH is scheduled by a PDCCH and other CORESETs different from the CORESET in which the PDCCH scheduling the PDSCH is located, a TCI state of a CORESET with a specific CORESET ID in a specific cell is used as a TCI state of the PDSCH.

(4) Further, whether to use the foregoing method is determined based on whether the CORESETs with time-domain overlapping in the cells are intra-frequency or inter-frequency. For example, when the CORESETs with time-domain overlapping are intra-frequency, the foregoing method is used. When the CORESETs with time-domain overlapping are inter-frequency, the foregoing method is not used, and in this case, the foregoing method is used for CORESETs with time-domain overlapping in each frequency band.

In the secondary-cell beam failure recovery mechanism of the multi-carrier communications system provided in this embodiment of the present disclosure, on the one hand, because the candidate beam reference signal does not need to be configured for the secondary cell, resource overheads for configuring and transmitting the candidate beam reference signal can be reduced. On the other hand, when a beam failure event occurs in one secondary cell (for example, the first cell), because the terminal device may transmit, in a cell other than this cell, a BFRQ indicating that a beam failure event has occurred in the secondary cell, the network device can learn the beam failure event and perform beam recovery (for example, by triggering aperiodic beam measurement and reporting, and releasing or reconfiguring the secondary cell in which the beam failure occurs) on the secondary cell in a timely manner. Therefore, in the method for transmitting a beam failure recovery request provided in this embodiment of the present disclosure, the beam failure recovery for the secondary cell in which a beam failure event has occurred can be quickly implemented while resource overheads for configuring and transmitting the candidate beam reference signal can be reduced.

Figure 4:
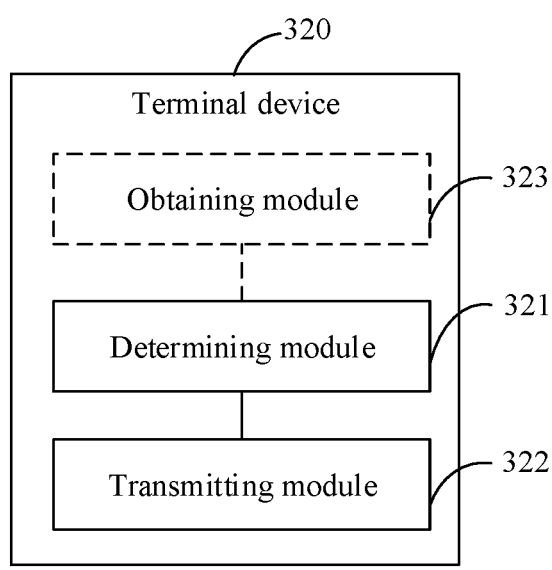
FIG. 4 is a schematic structural diagram 1 of a terminal device according to an embodiment of the present disclosure.

As shown in FIG. 4, an embodiment of the present disclosure provides a terminal device 320. The terminal device 320 includes a determining module 321 and a transmitting module 322.

The determining module 321 is configured to determine that a beam failure event has occurred in a first cell, where the first cell is served by a first network device.

The transmitting module 322 is configured to transmit a BFRQ to a second network device in a second cell, where the BFRQ is used to indicate that a beam failure event has occurred in the first cell, and the second cell is served by the second network device.

The second cell is different from the first cell, and both the first network device and the second network device provide services for the terminal device.

Optionally, the BFRQ includes an identifier of the first cell.

Optionally, the transmitting module 322 is specifically configured to: in a case in which a third network device has not configured any candidate beam reference signal for the terminal device in the first cell, or the third network device has not configured, for the terminal device in the first cell, any uplink channel resource for transmitting the BFRQ, transmit the BFRQ to the second network device in the second cell. The third network device provides a service for the terminal device.

Optionally, the second cell is a primary cell served by the second network device or a secondary cell served by the second network device Optionally, the second cell is determined in at least one of the following manners: a type of the second cell is specified by a communication protocol, the second cell is configured for the terminal device by a fourth network device, and the second cell is determined by the terminal device. The fourth network device provides a service for the terminal device.

Optionally, the second cell is a cell configured for the terminal device by the fourth network device and having a preset association with the first cell, or the second cell is a cell configured for the terminal device by the fourth network device, or the second cell is a cell that is indicated by the fourth network device for the terminal device in a plurality of cells configured for the terminal device by the fourth network device, or the second cell is a cell that is determined by the terminal device in a plurality of cells configured for the terminal device by the fourth network device.

Optionally, the transmitting module 322 is specifically configured to transmit the BFRQ to the second network device in the second cell through a first bearer, where the first bearer includes at least one of a physical random access channel PRACH, a physical uplink control channel PUCCH, a semi-persistent-physical uplink shared channel SP-PUSCH, and a media access control-control element MAC-CE command.

Optionally, the first bearer is specified by a communication protocol or the first bearer is configured or scheduled for the terminal device by a fifth network device. The fifth network device provides a service for the terminal device.

Optionally, as shown in FIG. 4, the terminal device 320 further includes an obtaining module 323. The obtaining module 323 is configured to obtain first information, where the first information is used to indicate second bearers, the second bearers are used to transmit the BFRQ by the terminal device, and the second bearers include at least two of the PRACH, the PUCCH, the SP-PUSCH, and the MAC-CE command. The determining module 321 is further configured to determine, according to a first preset rule, the first bearer from the second bearers obtained by the obtaining module 323. The first preset rule is any one of the following: any one bearer in the second bearers, a bearer with a highest priority in the second bearers, a next available bearer in the second bearers, and all bearers in the second bearers.

Optionally, the first preset rule is specified by the communication protocol, or the first preset rule is configured for the terminal device by a sixth network device, or the first preset rule is determined by the terminal device. The sixth network device provides a service for the terminal device.

Optionally, in a case in which the first bearer includes at least one of the PUCCH or the SP-PUSCH, the transmitting module 322 is specifically configured to: transmit the BFRQ to the second network device in the second cell through a target channel according to a second preset rule if the target channel includes second information, where the target channel is the PUCCH or the SP-PUSCH. The second preset rule is: transmitting the BFRQ based on priorities of the second information and the BFRQ, or multiplexing the second information and the BFRQ for transmission, or prioritizing transmission of the BFRQ.

Optionally, the second preset rule is specified by the communication protocol, or the second preset rule is configured for the terminal device by a seventh network device, or the second preset rule is determined by the terminal device. The seventh network device provides a service for the terminal device The terminal device provided in this embodiment of the present disclosure can implement the processes shown in the foregoing embodiment. To avoid repetition, details are not described herein again.

According to the terminal device provided in this embodiment of the present disclosure, the terminal device can determine occurrence of a beam failure event in the first cell and transmits the BFRQ to the second network device in the second cell, so as to notify a network device (which may be the first network device, the second network device, or another network device) processing the beam failure event of the first cell to trigger a beam failure recovery procedure of the first cell based on the BFRQ. With this scheme, in the case in which a beam failure event has occurred in the first cell, the BFRQ can be transmitted to the network device in the second cell that is different from the first cell, thereby resolving the prior-art problem that a terminal device cannot transmit a beam failure recovery request to a network device when a beam failure event occurs in a secondary cell.

Figure 5:
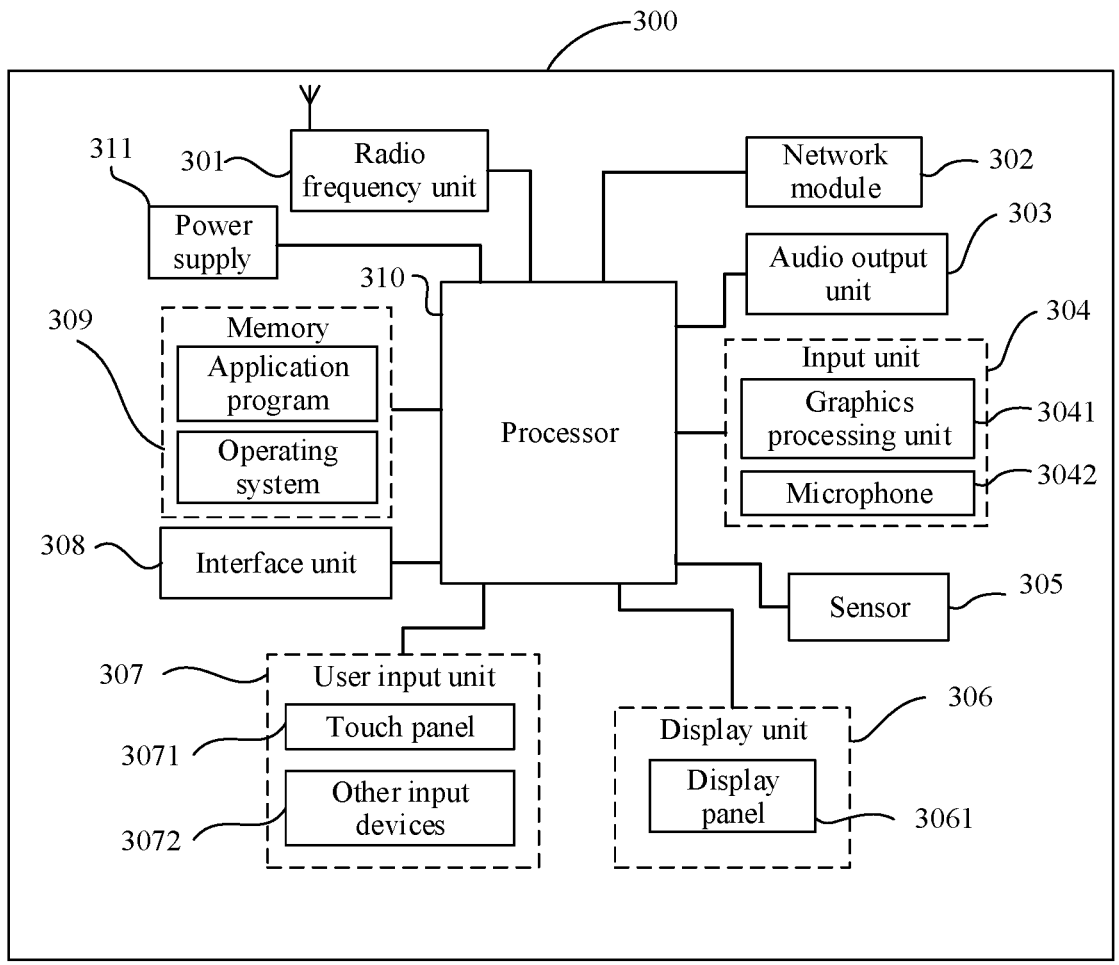
FIG. 5 is a schematic structural diagram 2 of a terminal device according to an embodiment of the present disclosure.

FIG. 5 is a schematic structural diagram of hardware of a terminal device for implementing the embodiments of the present disclosure. The terminal device 300 includes but is not limited to components such as a radio frequency unit 301, a network module 302, an audio output unit 303, an input unit 304, a sensor 305, a display unit 306, a user input unit 307, an interface unit 308, a memory 309, a processor 310, and a power supply 311. A person skilled in the art can understand that the structure of the terminal device 300 shown in FIG. 5 does not constitute any limitation on the terminal device. The terminal device 300 may include more or fewer components than those shown in the figure, or a combination of some components, or the components disposed differently. In this embodiment of the present disclosure, the terminal device 300 includes but is not limited to a mobile phone, a tablet computer, a laptop computer, a palmtop computer, an in-vehicle terminal device, a wearable device, a pedometer, and the like.

The processor 310 is configured to determine that a beam failure event has occurred in a first cell, where the first cell is served by a first network device. The radio frequency unit 301 is configured to transmit a BFRQ to a second network device in a second cell, where the BFRQ is used to indicate that a beam failure event has occurred in the first cell, and the second cell is served by the second network device. The second cell is different from the first cell, and both the first network device and the second network device provide services for the terminal device.

The terminal device provided in this embodiment of the present disclosure can determine occurrence of a beam failure event in the first cell and transmits the BFRQ to the second network device in the second cell, so as to notify a network device (which may be the first network device, the second network device, or another network device) processing the beam failure event of the first cell to trigger a beam failure recovery procedure of the first cell based on the BFRQ. With this scheme, in the case in which a beam failure event has occurred in the first cell, the BFRQ can be transmitted to the network device in the second cell that is different from the first cell, thereby resolving the prior-art problem that a terminal device cannot transmit a beam failure recovery request to a network device when a beam failure event occurs in a secondary cell.

It should be understood that in this embodiment of the present disclosure, the radio frequency unit 301 may be configured to: receive and transmit signals in an information receiving/sending procedure or a call procedure; and specifically, after receiving downlink data from a base station, transmit the downlink information to the processor 310 for processing, and in addition, transmit uplink data to the base station. Generally, the radio frequency unit 301 includes but is not limited to an antenna, at least one amplifier, a transceiver, a coupler, a low noise amplifier, a duplexer, and the like. In addition, the radio frequency unit 301 may also communicate with a network and other devices via a wireless communications system.

The terminal device 300 provides a user with wireless broadband internet access through the network module 302, for example, helping the user to transmit and receive e-mails, browse web pages, and access streaming media.

The audio output unit 303 may convert audio data received by the radio frequency unit 301 or the network module 302 or stored in the memory 309 into an audio signal and output the audio signal as a sound. In addition, the audio output unit 303 may also provide audio output (for example, a call signal received sound or a message received sound) related to a specific function performed by the terminal device 300. The audio output unit 303 includes a speaker, a buzzer, a receiver, and the like.

The input unit 304 is configured to receive an audio or video signal. The input unit 304 may include a graphics processing unit (GPU) 3041 and a microphone 3042. The graphics processing unit 3041 processes image data of a still picture or video obtained by an image capture apparatus (such as a camera) in a video capture mode or an image capture mode. A processed image frame may be displayed on the display unit 306. The image frame processed by the graphics processing unit 3041 may be stored in the memory 309 (or another storage medium) or be sent by the radio frequency unit 301 or the network module 302. The microphone 3042 is capable of receiving sounds and processing such sounds into audio data. The processed audio data can be converted into a format output that can be sent to a mobile communication base station through the radio frequency unit 301 in a telephone call mode.

The terminal device 300 may further include at least one sensor 305, for example, an optical sensor, a motion sensor, and other sensors. Specifically, the optical sensor may include an ambient light sensor and a proximity sensor. The ambient light sensor may adjust luminance of the display panel 3061 based on brightness of ambient light, and the proximity sensor may turn off the display panel 3061 and/or backlight when the terminal device 300 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal device, functions related to vibration recognition (such as pedometer and tapping), and the like. The sensor 305 may also include a fingerprint sensor, a pressure sensor, an iris sensor, a molecular sensor, a gyroscope, a barometer, a hygrometer, a thermometer, an infrared sensor, and the like. Details are not described herein.

The display unit 306 is configured to display information input by the user or information provided to the user. The display unit 306 may include a display panel 3061, and the display panel 3061 may be configured in a form of a liquid crystal display (LCD), an organic light-emitting diode (OLED), or the like.

The user input unit 307 may be configured to receive input digit or character information and generate key signal input related to user setting and function control of the terminal device 300. Specifically, the user input unit 307 may include a touch panel 3071 and other input devices 3072. The touch panel 3071 is also referred to as a touchscreen and can collect a touch operation (such as an operation performed by the user on the touch panel 3071 or near the touch panel 3071 with a finger or by using any proper object or accessory such as a stylus) of the user on or near the touch panel 3071. The touch panel 3071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and sends the touchpoint coordinates to the processor 310, and can receive a command sent by the processor 310 and execute the command. In addition, the touch panel 3071 may be implemented in a plurality of forms, for example, as a resistive, capacitive, infrared, or surface acoustic wave touch panel. In addition to the touch panel 3071, the user input unit 307 may further include other input devices 3072. Specifically, the other input devices 3072 may include but are not limited to a physical keyboard, a function key (such as a volume control key or a switch key), a trackball, a mouse, and a joystick. Details are not described herein.

Further, the touch panel 3071 may cover the display panel 3061. When detecting a touch operation on or near the touch panel 3071, the touch panel 3071 transmits the touch operation to the processor 310 to determine a type of a touch event. Then, the processor 310 provides a corresponding visual output on the display panel 3061 based on the type of the touch event. Although in FIG. 5, the touch panel 3071 and the display panel 3061 act as two independent components to implement input and output functions of the terminal device 300, in some embodiments, the touch panel 3071 and the display panel 3061 may be integrated to implement the input and output functions of the terminal device 300. This is not specifically limited herein.

The interface unit 308 is an interface between an external apparatus and the terminal device 300. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 308 may be configured to receive an input (for example, data information or power) from an external apparatus and transmit the received input to one or more components within the terminal device 300, or may be configured to transmit data between the terminal device 300 and the external apparatus.

The memory 309 may be configured to store software programs and various data. The memory 309 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 309 may include a high-speed random access memory, and may further include a non-volatile memory such as a disk storage device, a flash memory device, or another volatile solid-state storage device.

The processor 310 is a control center of the terminal device 300, uses various interfaces and lines to connect parts of the entire terminal device 300, and executes various functions and processing data of the terminal device by running or executing software programs and/or modules stored in the memory 309 and invoking data stored in the memory 309, so as to perform overall monitoring on the terminal device 300. The processor 310 may include one or more processing units. Optionally, an application processor and a modem processor may be integrated in the processor 310. The application processor primarily processes an operating system, user interfaces, application programs, and the like. The modem processor primarily processes radio communication. It can be understood that the modem processor may alternatively be not integrated in the processor 310.

The terminal device 300 may further include a power supply 311 (such as a battery) that supplies power to components. Optionally, the power supply 311 may be logically connected to the processor 310 through a power management system. In this way, functions such as charge management, discharge management, and power consumption management are implemented by using the power management system.

In addition, the terminal device 300 includes some functional modules that are not shown, details of which are not described herein.

Figure 6:
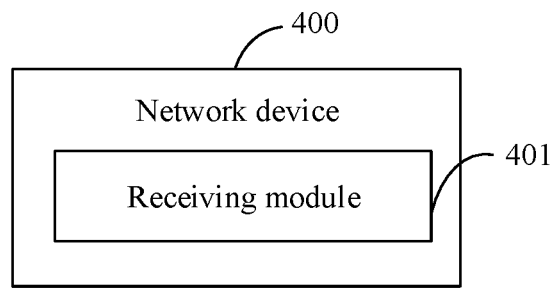
FIG. 6 is a schematic structural diagram 1 of a network device according to an embodiment of the present disclosure.

FIG. 6 is a schematic diagram of a hardware structure of a network device implementing an embodiment of the present disclosure. The network device 400 is a second network device. The network device 400 includes a receiving module 401.

The receiving module 401 is configured to receive a BFRQ from a terminal device in a second cell, where the BFRQ is used to indicate that a beam failure event has occurred in a first cell, the second cell is served by the second network device, and the first cell is served by a first network device. The second cell is different from the first cell.

Optionally, the BFRQ includes an identifier of the first cell.

Optionally, the receiving module 401 is specifically configured to: in a case in which a third network device has not configured any candidate beam reference signal for the terminal device in the first cell, or the third network device has not configured, for the terminal device in the first cell, any uplink channel resource for transmitting the BFRQ, receive the BFRQ from the terminal device in the second cell.

Optionally, the second cell is a primary cell served by the second network device or a secondary cell served by the second network device.

Optionally, the second cell is determined in at least one of the following manners: a type of the second cell is specified by a communication protocol, the second cell is configured for the terminal device by a fourth network device, and the second cell is determined by the terminal device.

Optionally, the second cell is a cell configured for the terminal device by the fourth network device and having a preset association with the first cell, or the second cell is a cell configured for the terminal device by the fourth network device, or the second cell is a cell that is indicated by the fourth network device for the terminal device in a plurality of cells configured for the terminal device by the fourth network device, or the second cell is a cell that is determined by the terminal device in a plurality of cells configured for the terminal device by the fourth network device.

Optionally, the receiving module 401 is specifically configured to receive the BFRQ from the terminal device in the second cell through a first bearer, where the first bearer includes at least one of a PRACH, a PUCCH, an SP-PUSCH, and a MAC-CE command.

Optionally, the first bearer is specified by the communication protocol, or the first bearer is configured or scheduled for the terminal device by a fifth network device.

The network device provided in this embodiment of the present disclosure may be the second network device and can implement the processes shown in the foregoing embodiment. To avoid repetition, details are not described herein again.

According to the network device provided in this embodiment of the present disclosure, the network device receives the BFRQ that is transmitted by the terminal device to the network device in the second cell, so as to notify a network device (which may be the first network device, the second network device, or another network device) processing the beam failure event of the first cell to trigger a beam failure recovery procedure of the first cell based on the BFRQ. With this scheme, in the case in which a beam failure event has occurred in the first cell, the BFRQ can be transmitted to the network device in the second cell that is different from the first cell, thereby resolving the prior-art problem that a terminal device cannot transmit a beam failure recovery request to a network device when a beam failure event occurs in a secondary cell.

Figure 7:
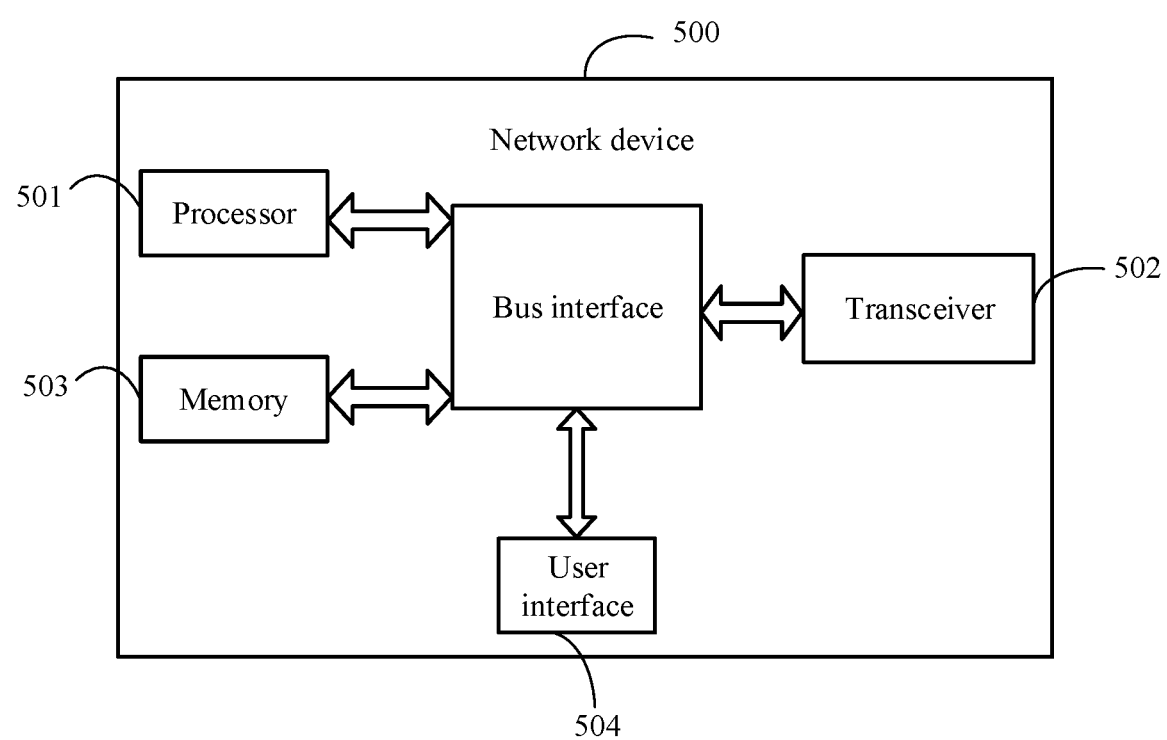
FIG. 7 is a schematic structural diagram 2 of a network device according to an embodiment of the present disclosure.

FIG. 7 is a schematic diagram of a hardware structure of a network device implementing an embodiment of the present disclosure. The network device 500 is a second network device. The network device 500 includes a processor 501, a transceiver 502, a memory 503, a user interface 504, and a bus interface.

The transceiver 502 is configured to receive a BFRQ from a terminal device in a second cell, where the BFRQ is used to indicate that a beam failure event has occurred in a first cell, the second cell is served by the second network device, and the first cell is served by a first network device. The second cell is different from the first cell.

According to the network device provided in this embodiment of the present disclosure, the network device receives the BFRQ that is transmitted by the terminal device to the network device in the second cell, so as to notify a network device processing the beam failure event of the first cell (which may be the first network device, the second network device, or another network device) to trigger a beam failure recovery procedure for the first cell based on the BFRQ. With this scheme, in the case in which a beam failure event has occurred in the first cell, the BFRQ can be transmitted to the network device in the second cell that is different from the first cell, thereby resolving the prior-art problem that a terminal device cannot transmit a beam failure recovery request to a network device when a beam failure event occurs in a secondary cell.

In this embodiment of the present disclosure, in FIG. 7, a bus architecture may include any quantity of interconnected buses and bridges, and specifically connects together circuits that are of one or more processors represented by the processor 501 and of a memory represented by the memory 503. The bus architecture may further interconnect various other circuits such as a peripheral device, a voltage regulator, and a power management circuit. These are all well known in the art, and therefore are not further described in this specification. The bus interface provides an interface. The transceiver 502 may be a plurality of components, that is, the transceiver 502 includes a transmitter and a receiver, and provides a unit for communicating with various other apparatuses on a transmission medium. For different terminal devices, the user interface 504 may also be an interface that can be externally or internally connected to a required device. The connected device includes but is not limited to a keypad, a display, a speaker, a microphone, a joystick, and the like. The processor 501 is responsible for bus architecture management and general processing. The memory 503 may store data used when the processor 501 performs an operation.

In addition, the network device 500 further includes some functional modules that are not shown. Details are not described herein.

Optionally, an embodiment of the present disclosure further provides a terminal device, including a processor, a memory, and a computer program stored in the memory and capable of running on the processor. When the computer program is executed by the processor, the processes of the method for transmitting the beam failure recovery request in the foregoing Embodiment can be implemented and a same technical effect can be achieved. To avoid repetition, details are not described herein again.

Optionally, an embodiment of the present disclosure further provides a network device, where the network device is a second network device, including a processor, a memory, and a computer program stored in the memory and capable of running on the processor. When the computer program is executed by the processor, the processes of the method for transmitting the beam failure recovery request in the foregoing Embodiment can be implemented and a same technical effect can be achieved. To avoid repetition, details are not described herein again.

An embodiment of the present disclosure further provides a computer-readable storage medium, where a computer program is stored in the computer-readable storage medium. When the computer program is executed by the processor, a plurality of processes of the method for transmitting the beam failure recovery request in the foregoing embodiments can be implemented and a same technical effect can be achieved. To avoid repetition, details are not described herein again. The computer-readable storage medium is, for example, a read-only memory (ROM), a random access memory (RAM), a magnetic disk, or an optical disc.

It should be noted that the terms "include", "comprise", or any of their variants in this specification are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more restrictions, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the related art may be implemented in a form of a software product. The software product is stored in a storage medium (such as a ROM/RAM, a magnetic disk, or an optical disc), and includes several instructions for instructing a terminal device (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A method for transmitting a beam failure recovery request, comprising:

determining, by a terminal device, that a beam failure event has occurred in a first cell, wherein the first cell is served by a first network device; and transmitting, by the terminal device, a beam failure recovery request (BFRQ) to a second network device in a second cell, wherein the BFRQ is used to indicate that a beam failure event has occurred in the first cell, and the second cell is served by the second network device; wherein the second cell is different from the first cell;

wherein the transmitting, by the terminal device, the BFRQ to the second network device in the second cell comprises:

transmitting, by the terminal device, the BFRQ to the second network device in the second cell through a first bearer, wherein the first bearer comprises at least one of a physical uplink control channel (PUCCH) or a semi-persistent-physical uplink shared channel (SP-PUSCH);

wherein the transmitting, by the terminal device, the BFRQ to the second network device in the second cell through the first bearer comprises:

transmitting, by the terminal device, the BFRQ to the second network device in the second cell through a target channel according to a second preset rule if the target channel comprises second information, wherein the target channel is the PUCCH or the SP-PUSCH, and the second information is to-be-transmitted information other than the BFRQ; and the second preset rule is: transmitting the BFRQ based on priorities of the second information and the BFRQ, or multiplexing the second information and the BFRQ for transmission, or prioritizing transmission of the BFRQ.

2. The method according to claim 1, wherein the BFRQ comprises an identifier of the first cell.

3. The method according to claim 1, wherein the transmitting, by the terminal device, the BFRQ to the second network device in the second cell comprises:

in a case in which a third network device has not configured any candidate beam reference signal for the terminal device in the first cell, or the third network device has not configured, for the terminal device in the first cell, any uplink channel resource for transmitting the BFRQ, transmitting, by the terminal device, the BFRQ to the second network device in the second cell.

4. The method according to claim 1, wherein the second cell is a primary cell served by the second network device or a secondary cell served by the second network device.

5. The method according to claim 1, wherein the second cell is determined in at least one of the following manners: a type of the second cell is specified by a communication protocol, the second cell is configured for the terminal device by a fourth network device, and the second cell is determined by the terminal device.

6. The method according to claim 5, wherein the second cell is a cell configured for the terminal device by the fourth network device and having a preset association with the first cell, or the second cell is a cell configured for the terminal device by the fourth network device, or the second cell is a cell that is indicated by the fourth network device for the terminal device in a plurality of cells configured for the terminal device by the fourth network device, or the second cell is a cell that is determined by the terminal device in a plurality of cells configured for the terminal device by the fourth network device.

7. A terminal device, comprising a processor, a memory, and a computer program stored in the memory and capable of running on the processor, wherein when the computer program is executed by the processor, steps of a method for transmitting a beam failure recovery request are implemented, and the method comprises:

determining that a beam failure event has occurred in a first cell, wherein the first cell is served by a first network device; and transmitting a beam failure recovery request (BFRQ) to a second network device in a second cell, wherein the BFRQ is used to indicate that a beam failure event has occurred in the first cell, and the second cell is served by the second network device; wherein the second cell is different from the first cell;

wherein the transmitting the BFRQ to the second network device in the second cell comprises:

transmitting the BFRQ to the second network device in the second cell through a first bearer, wherein the first bearer comprises at least one of a physical uplink control channel (PUCCH) or a semi-persistent-physical uplink shared channel (SP-PUSCH);

wherein the transmitting the BFRQ to the second network device in the second cell through the first bearer comprises:

transmitting the BFRQ to the second network device in the second cell through a target channel according to a second preset rule if the target channel comprises second information, wherein the target channel is the PUCCH or the SP-PUSCH, and the second information is to-be-transmitted information other than the BFRQ; and the second preset rule is: transmitting the BFRQ based on priorities of the second information and the BFRQ, or multiplexing the second information and the BFRQ for transmission, or prioritizing transmission of the BFRQ.

8. The terminal device according to claim 7, wherein the BFRQ comprises an identifier of the first cell.

9. The terminal device according to claim 7, wherein the transmitting the BFRQ to the second network device in the second cell comprises:

in a case in which a third network device has not configured any candidate beam reference signal for the terminal device in the first cell, or the third network device has not configured, for the terminal device in the first cell, any uplink channel resource for transmitting the BFRQ, transmitting the BFRQ to the second network device in the second cell.

10. The terminal device according to claim 7, wherein the second cell is a cell configured for the terminal device by the fourth network device and having a preset association with the first cell, or the second cell is a cell configured for the terminal device by the fourth network device, or the second cell is a cell that is indicated by the fourth network device for the terminal device in a plurality of cells configured for the terminal device by the fourth network device, or the second cell is a cell that is determined by the terminal device in a plurality of cells configured for the terminal device by the fourth network device.

11. A network device, wherein the network device is a second network device, and comprises a processor, a memory, and a computer program stored in the memory and capable of running on the processor; and when the computer program is executed by the processor, steps of a method for transmitting a beam failure recovery request are implemented, and the method comprises:

receiving a beam failure recovery request (BFRQ) from a terminal device in a second cell, wherein the BFRQ is used to indicate that a beam failure event has occurred in a first cell, the second cell is served by the second network device, and the first cell is served by a first network device; wherein the second cell is different from the first cell;

wherein the receiving the BFRQ from the terminal device in the second cell comprises:

receiving the BFRQ from the terminal device in the second cell through a first bearer, wherein the first bearer comprises at least one of a physical uplink control channel (PUCCH) or a semi-persistent-physical uplink shared channel (SP-PUSCH);

wherein the method further comprises: prior to the receiving the BFRQ from the terminal device in the second cell through the first bearer, configuring a second preset rule for the terminal device, wherein the second preset rule is: transmitting the BFRQ based on priorities of second information comprised in a target channel and the BFRQ, or multiplexing the second information and the BFRQ for transmission, or prioritizing transmission of the BFRQ, the target channel being the PUCCH or the SP-PUSCH, and the second information being to-be-transmitted information other than the BFRQ.

12. The network device according to claim 11, wherein the BFRQ comprises an identifier of the first cell.

13. The network device according to claim 11, wherein the receiving the BFRQ from the terminal device in the second cell comprises:

in a case in which a third network device has not configured any candidate beam reference signal for the terminal device in the first cell, or the third network device has not configured, for the terminal device in the first cell, any uplink channel resource for transmitting the BFRQ, receiving the BFRQ from the terminal device in the second cell.

14. The network device according to claim 11, wherein the second cell is a primary cell served by the second network device or a secondary cell served by the second network device;

and/or, the second cell is determined in at least one of the following manners: a type of the second cell is specified by a communication protocol, the second cell is configured for the terminal device by a fourth network device, and the second cell is determined by the terminal device.

15. The network device according to claim 11, wherein the second cell is a cell configured for the terminal device by the fourth network device and having a preset association with the first cell, or the second cell is a cell configured for the terminal device by the fourth network device, or the second cell is a cell that is indicated by the fourth network device for the terminal device in a plurality of cells configured for the terminal device by the fourth network device, or the second cell is a cell that is determined by the terminal device in a plurality of cells configured for the terminal device by the fourth network device.

* * * * *